United States Patent [19]
Krishnaswamy et al.

[11] Patent Number: 5,544,181
[45] Date of Patent: Aug. 6, 1996

[54] LIQUID NITROGEN TEMPERATURE MICRO-WIGGLER

[75] Inventors: Jayaram Krishnaswamy, Plainsboro; Michael F. Reusch, West Windsor, both of N.J.

[73] Assignee: Grumman Aerospace Corporation, Los Angeles, Calif.

[21] Appl. No.: 333,433

[22] Filed: Nov. 2, 1994

[51] Int. Cl.$^6$ ..................................................... H01S 3/00
[52] U.S. Cl. ................................................................ 372/2
[58] Field of Search ..................................................... 378/2

[56] References Cited

U.S. PATENT DOCUMENTS

| 5,048,025 | 9/1991 | Takemura | 372/2 |
| 5,190,911 | 3/1993 | Takemura | 372/2 |
| 5,410,558 | 4/1994 | Hackett | 372/2 |

OTHER PUBLICATIONS

I. Ben Zvi et al., "Performance of a superconducting, high field subcentimeter undulator", *Nuclear Instrumentation and Methods in Physics*, A 318, 781–788, (1992) Date Not Available.

R. Warren, "Progress with the slotted–tube pulsed microwiggler", *Nuclear Instrumentation and Methods in Physics*, A 318, 789–793, (1992) Date Not Available.

R. Tatchyn and T. Cremer, "Variable–Period Magnetostatic Undulator Designs Based on Iron–Free Current Configuration", *IEEE Transactions on Magnetics*, vol. 26, No. 6, 3102–3123 (1990) Date Not Available.

T. R. Dinger, "direct Observation of Electronic Anisotrophy in Single–Crystal $Y_1Ba_2Cu_3O_{7-x}$", *Phys. Rev. Lett.* vol. 58 p. 2687 (1987) Date Not Available.

*Primary Examiner*—Leon Scott, Jr.
*Attorney, Agent, or Firm*—Terry J. Anderson; Karl J. Hoch, Jr.

[57] ABSTRACT

A liquid nitrogen temperature micro-wiggler assembly consists of a stack of micro-wiggler elements. Each micro-wiggler element has a sandwich structure consisting of a non-metallic substrate, a superconducting layer on top of the substrate and a conductive layer on top of the superconducting layer. The undulating magnetic field produced by the micro-wiggler assembly, when supplied with a current, interacts with the electron beam passing through an isolated tube in the center of the micro-wiggler assembly and transverse to it, resulting in the production of optical radiation.

18 Claims, 3 Drawing Sheets

LIQUID NITROGEN TEMPERATURE MICRO-WIGGLER

BACKGROUND OF THE INVENTION

1. Field of the Invention

The present invention relates to liquid nitrogen temperature micro-wigglers. More particularly, the invention relates to micro-wigglers for free electron lasers (FEL). Still more particularly, the invention relates to the production of shorter radiation wavelengths with FEL devices.

2. The Prior Art

A FEL is a device in which an electromechanical or a magnetomechanical structure, called a wiggler or an undulator creates a magnetic field which periodically alternates in direction. Electrons passing through this magnetic field are deflected in a periodic fashion, and as a result emit characteristic optical radiation.

FEL's have the advantage, over other radiation producing devices, in that their radiation wavelength is variable by changing either the energy of the electron entering the wiggler or the strength of the magnetic field created by the wiggler.

There is a continuing need to produce shorter radiation wavelengths with FEL devices which are simpler and more compact in construction.

The radiated wavelength $\lambda_r$ of a free electron laser depends on the wavelength or spatial period $\lambda_w$ of the wiggler according to the following approximate formula $$\lambda_r = \frac{1-\beta_z}{\beta_z} \lambda_w \quad (1)$$

where $\beta_z$ is the average longitudinal velocity of the electrons, the traverse motion having been taken into account, divided by the speed of light c. For electrons moving near the speed of light, $\beta_z \approx 1$ the above formula reduces to the simpler result $$\lambda_r = \frac{\lambda_w}{2\gamma^2} \quad (2)$$

where $\gamma$ is the relativistic factor.

The following table illustrates the dependence of $\gamma$ and radiated wavelength $\lambda_r$ in nanometers on electron energy in MeV for a wiggler of one centimeter period,

| Energy in MeV | $\gamma$ | $\lambda_r$ Nanometers |
| --- | --- | --- |
| 10 | 20.57 | 11817.78 |
| 25 | 49.92 | 2006.18 |
| 50 | 98.85 | 511.74 |
| 75 | 147.77 | 228.98 |
| 100 | 196.69 | 129.24 |
| 150 | 294.54 | 57.64 |
| 200 | 392.38 | 32.47 |

A shorter wavelength radiation may obviously be produced for a fixed wiggler period by increasing the electron energy.

However, for electrons of a given energy, one can also produce shorter wavelength radiation by reducing the size of the wiggler period. Furthermore, reducing the wiggler period lowers the electron energy required to produce a given wavelength of radiation.

The shortest wiggler periods known to applicants are the subcentimeter superconducting planar undulator with a period of 0.88 cm at Brookhaven National Laboratory (BNL), and the slotted-tube, non-planar, 3 mm period micro-wiggler at Los Alamos National Laboratory (LANL).

The former BNL device has the disadvantage of the necessity for helium refrigeration and the latter LANL device has the disadvantage of pulsed operation and generation of extraneous fields, which tend to degrade FEL performance.

BRIEF SUMMARY OF THE INVENTION

In accordance with the invention, a liquid nitrogen temperature micro-wiggler element comprises a non-conductive substrate having two additional layers disposed thereon. A thin epitaxial layer of high Tc superconductor is provided on top of the non-conductive substrate. A substantially metallic conductive layer is provided on top of the thin epitaxial high Tc layer.

A plurality of micro-wiggler elements are stacked on one another. Energizing means energizes the micro-wiggler elements and connects the conductive layers of the elements in series or parallel arrangement. (The high Tc superconductor layer consists of YBaCuO or any of the recently discovered ceramic-oxide-type superconductors. The high Tc superconductor consists of one of silver and silver-sheathed high Tc filament. The high Tc filament consists of ceramic material.)

The non-conductive substrate and the thin layer are of substantially rectangular configuration and have an opening for receiving a vacuum tube in the geometric center of the configuration. The vacuum tube isolates an electron beam from a liquid coolant and the atmosphere. The non-conductive substrate has a plurality of apertures formed in appropriate locations for aligning the micro-wiggler element with other elements. A liquid coolant cools the metallic conductor. For example, the whole micro-wiggler assembly can be immersed in a pool of liquid $N_2$.

The metallic conductor consists of conductive material adapted to be connected to a power supply. The micro-wiggler produces a magnetic field and the vacuum tube has an electron flow transverse to the magnetic field produced by the micro-wiggler. The liquid coolant is liquid nitrogen. The metallic conductor consists of silver or silver-sheathed high Tc conductor.

In accordance with the invention, a method of producing a micro-wiggler assembly having small wiggler periods while obtaining high geometrical tolerances comprises the step of sandwiching a thin epitaxial layer of high Tc superconductor between a substrate and a metal conductor to provide a micro-wiggler element. The micro-wiggler element is energized to generate a magnetic field. An electron beam is injected transverse to the magnetic field and the metal conductor or the whole assembly is cooled by liquid nitrogen.

The principal object of the invention is to provide a micro-wiggler utilizing the high Tc ceramic type superconductor.

An object of the invention is to provide a micro-wiggler utilizing liquid nitrogen cooling.

Another object of the invention is to provide a micro-wiggler that can be operated continuously and need not be pulsed.

Still another object of the invention is to provide a micro-wiggler whereby the conductor geometry and alignment can be made to lithograph perfection of accuracy.

Yet another object of the invention is to provide a micro-wiggler that is iron-free.

Another object of the invention is to provide a specified output radiation polarization by interposing mutually transverse planar wigglers of the invention.

Still another object of the invention is to provide a micro-wiggler that incorporates variable phasing for tuning the wiggler.

Yet another object of the invention is to provide a micro-wiggler having a variable period.

Another object of the invention is to provide a micro-wiggler such that tapering of the wiggler is easy to incorporate.

BRIEF DESCRIPTION OF THE DRAWINGS

Other objects and features of the present invention will become apparent from the following detailed description considered in connection with the accompanying drawings which discloses an embodiment of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENT

Figure 1A:
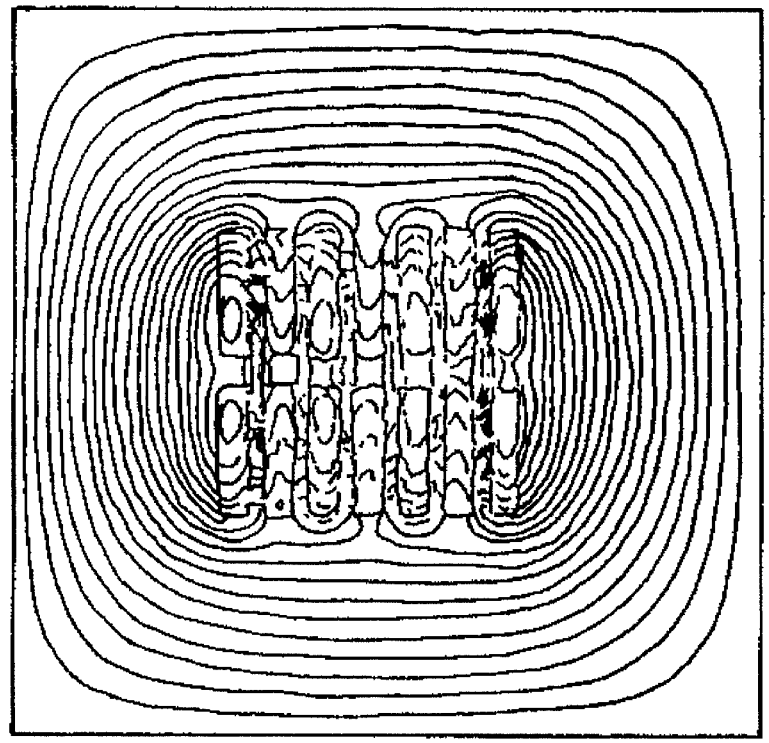
FIG. 1a is a graphical representation of the magnetic flux of the micro-wiggler of the invention.
Figure 1B:
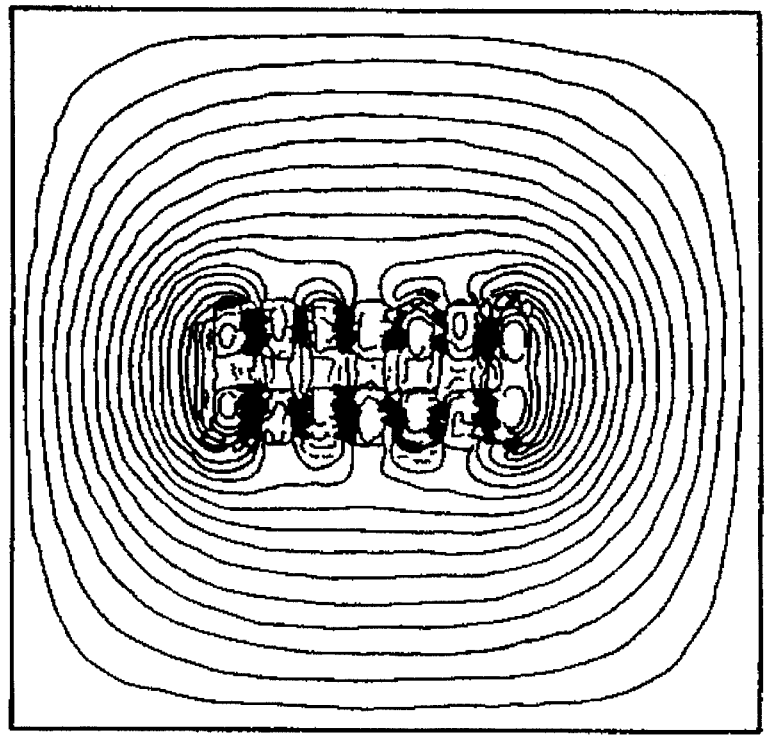
FIG. 1b is a graphical representation of the magnetic flux of the micro-wiggler of the invention.
Figure 1C:
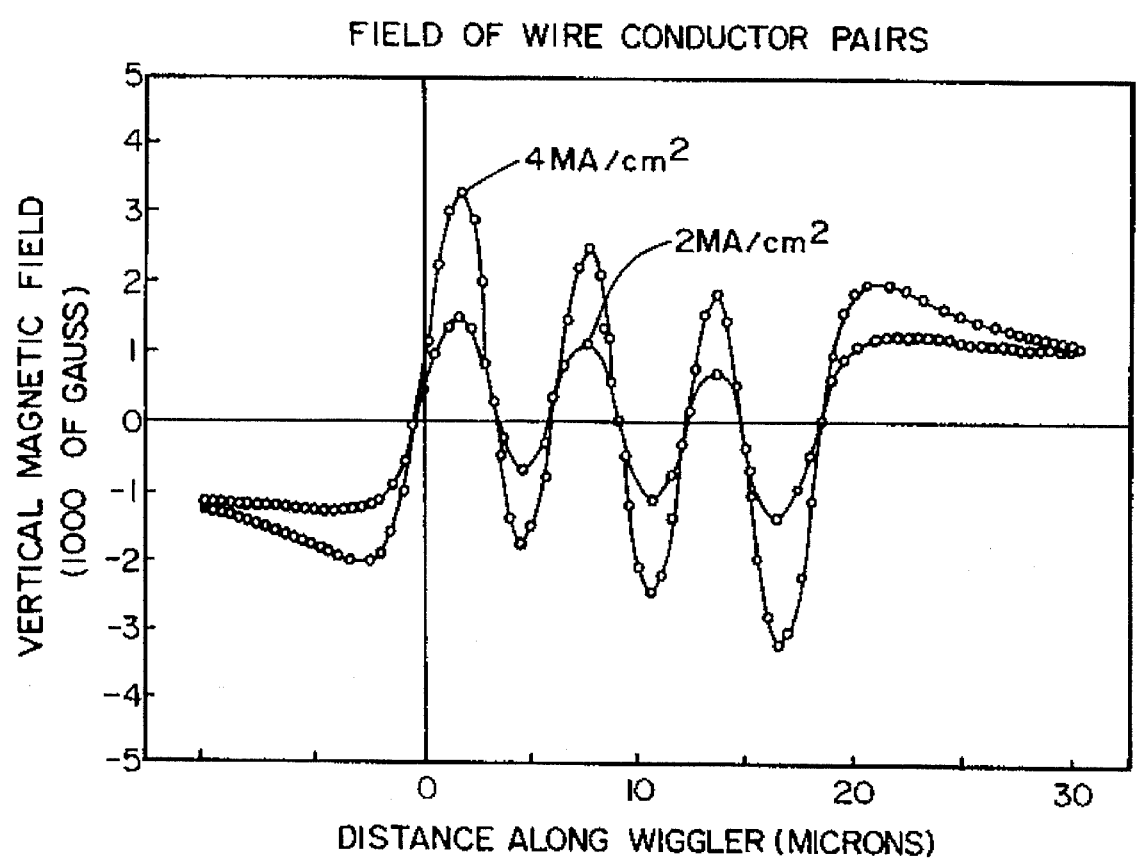
FIG. 1c is a graphical representation of the magnetic field of the micro-wiggler of the invention.

FIG. 1a shows the magnetic flux of a planar-type FEL wiggler constructed of a periodic lattice of electrical current-carrying conductors having a current density of 4 megamps per cm$^2$. The sign of current in the conductors alternates from pair to pair, by the current flowing in and then out of the plane of the drawing, creating a magnetic field between them which is alternately in the upward and then in the downward direction (FIG. 1c). FIG. 1b shows a similar plot of magnetic flux in the wire pair wiggler where the current density is 2 megamps per cm$^2$.

FIG. 1c shows the magnetic field provided in a planar wiggler.

The electron beam coming from an electron source encounters this magnetic field, which causes the individual electrons to execute transverse oscillations, that is, in and out of the plane of the drawing. When electrons change directions, radiation is produced.

In all wigglers, to produce a given wiggler magnetic field, the physical size of the conductors places a limit on the practical minimum size of the wiggler period.

Practical current densities of more than 2 million amperes per square centimeter can be sustained in the epitaxial YBaCuO thin films deposited on strontium titanate, magnesium oxide, zirconia, and lanthanum aluminate substrates. The best quality films with the highest current density values are deposited on strontium titanate substrate because of the close epitaxial matching of this material with that of YBaCuO. It should be noted that current densities some 100 times larger are theoretically predicted.

These films become superconducting at 77 degrees Kelvin, the temperature of liquid nitrogen at one atmosphere of pressure.

Several practical methods of depositing these films exist, among them electron beam deposition, laser ablative deposition, RF sputtering and spray pyrolysis.

Thick or thin films made from high Tc materials can be patterned, both by wet chemical and dry methods without damaging neither their transition temperature nor their current carrying properties. Laser ablative patterning is a dry method and photo lithography followed by acid etching is a wet method. In addition, excellent dimensional control, to the micron and submicron level, of the films is possible.

Typically, these epitaxial films have a high critical magnetic field value in the zero resistance state.

Appropriate lithograph techniques combined with appropriate deposition techniques can provide a practical method of obtaining thicker films possessing superior crystalline quality.

Film thickness may ultimately be limited by a breakdown in the film's epitaxial properties, but films thicker than one micron are easily possible and the widths of the epitaxial films can be large; that is, on the order of several centimeters.

The maximum magnetic field produced by such a thin film, of thickness $\tau$, carrying the current density of $J_{max}$ may be easily predicted by assuming that the film is long in the transverse directions. Then, $$B_{max} = \frac{\tau J_{max} \mu_0}{2} \tag{3}$$

Assuming conservative values of a thickness of only one micron and a maximum current density of 2 million amperes per square centimeter, the predicted maximum field is 250 Gauss. A five micron film would produce 1250 Gauss.

Figure 2:
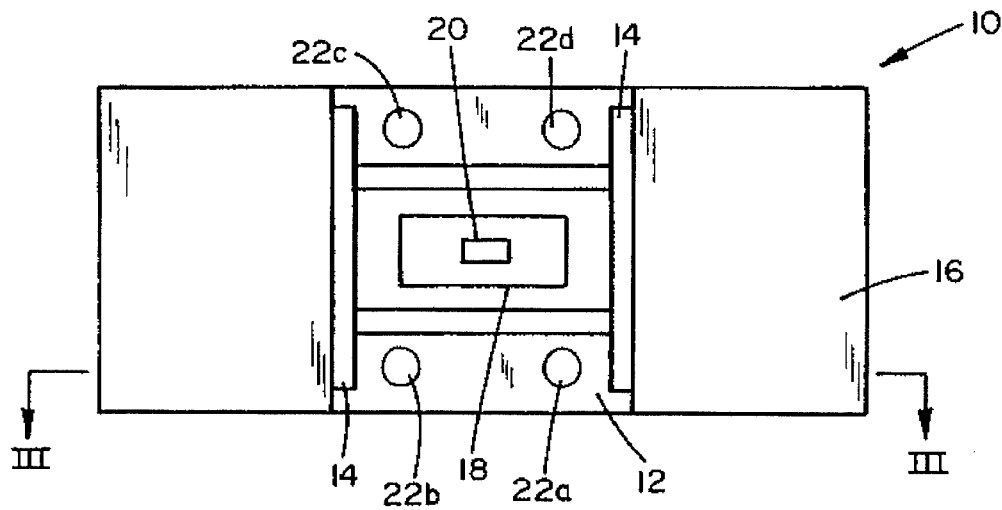
FIG. 2 is a top view schematic diagram of an embodiment of the micro-wiggler element of the invention.

Referring to FIG. 2, micro-wiggler element 10 is shown having a substantially rectangularly shaped non-conductive substrate 12, on which a thin epitaxial layer or film 14 of high Tc superconductor is disposed. A metal conductor 16 is disposed on thin layer 14.

Thin layer 14 and substrate 12 have a suitably shaped opening 18 in the geometric center of which a vacuum pipe 20 may be inserted. The opening may be rectangular, for example. Vacuum pipe 20 serves to isolate the electron beam from the coolant and atmosphere. In addition, substrate 12 may also have alignment holes 22a, 22b, 22c and 22d for the purpose of alignment with other elements.

Figure 3:
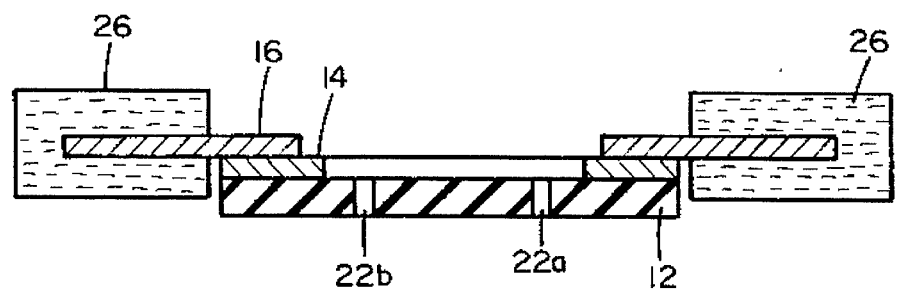
FIG. 3 is a cross sectional view, taken along the lines III—III, of FIG. 2.

FIG. 3 shows a cross sectional view of the embodiment of FIG. 2, taken along the lines III—III, of FIG. 2 As clearly shown in FIG. 3, metal conductor 16, thin layer 14 and substrate 12 are sandwiched together with said metal conductor on top, said thin film in the middle and said substrate on the bottom. Liquid nitrogen 26 cools everything, including the metal conductor 16, the thin layer 14, the substrate 12 and even the beam pipe.

Figure 4:
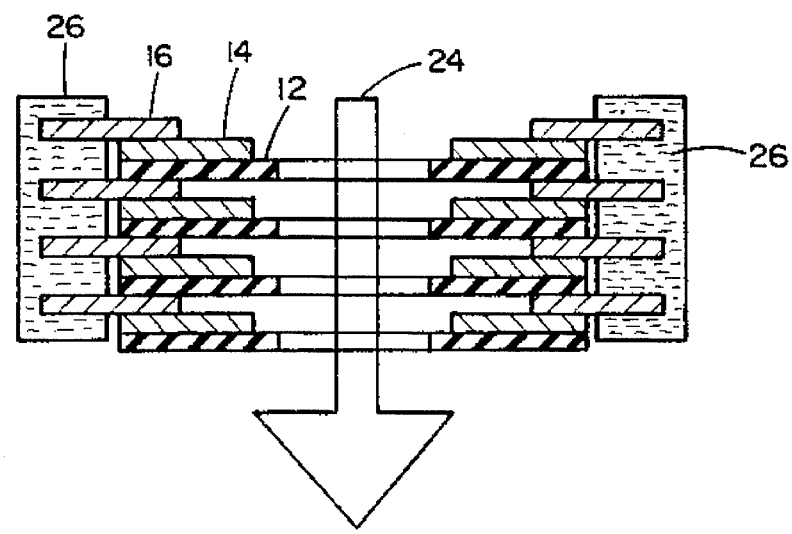
FIG. 4 is a cross sectional view of the invention having a plurality of stacked micro-wiggler elements or micro-wiggler conductors.

FIG. 4 discloses the embodiment of the invention whereby a plurality of wiggler elements are stacked on one another. The stack forms a micro-wiggler assembly which may be cooled by being immersed in a bath of liquid nitrogen 26. Metallic conductors 16 separate the wiggler elements. The metal conductors 16 are suitably connected to an external power source (not shown in the FIGS.). FIG. 4 shows the direction of electron beam 24 relative to the disposition of the stacked wiggler elements.

While a single embodiment of the present invention has been shown and described, it is to be understood that many changes and modifications may be made thereunto without departing from the spirit and scope of the invention as defined in the appended claims.

What is claimed is:

1. A micro-wiggler element for a micro-wiggler which produces small wiggler periods comprising:
    a non-conductive substrate having a centrally located opening for receiving an electron beam;
    a thin epitaxial film of high Tc superconductor for carrying current supplied by a power source thereby creating a magnetic field, said thin epitaxial film having a centrally located opening for receiving said electron beam, said thin epitaxial film deposited on top of said non-conductive substrate; and
    a pair of substantially metallic conductors connected to opposite ends of said thin epitaxial film for connecting said thin epitaxial film to said power source.

2. A micro-wiggler element as claimed in claim 1, wherein the thin epitaxial film of high Tc superconductor is YbaCuO.

3. A micro-wiggler element as claimed in claim 1, wherein said pair of metallic conductors are silver.

4. A micro-wiggler element as claimed in claim 1, wherein said pair of metallic conductors are silver-sheathed high Tc filaments made of ceramic material.

5. A micro-wiggler element as claimed in claim 1, wherein said non-conductive substrate and said thin epitaxial film are rectangular in shape.

6. A micro-wiggler element as claimed in claim 1, wherein said non-conductive substrate has a plurality of apertures formed therethrough for aligning said micro-wiggler element with other micro-wiggler elements.

7. A micro-wiggler element as claimed in claim 1, wherein said pair of metallic conductors are configured to be connected to a power supply.

8. A method of producing a micro-wiggler for a free electron laser having a small geometric footprint and producing small wiggler periods, said method comprising the steps of:
    building a micro-wiggler element by depositing a thin epitaxial film of high Tc superconductor on top of a non-conductive substrate and connecting a pair of substantially metallic conductors to opposite ends of said thin epitaxial film;
    stacking a plurality of said micro-wiggler elements on one another to form a micro-wiggler assembly;
    creating an opening along an axis of said micro-wiggler assembly;
    inserting a vacuum tube through said axial opening of said micro-wiggler assembly;
    cooling the micro-wiggler assembly to a temperature which allows superconductivity; and
    energizing the micro-wiggler assembly to generate an alternating magnetic field along the axis of said micro-wiggler; and
    injecting an electron beam through said vacuum tube into said alternating magnetic field thereby causing the electron beam to wiggle rapidly.

9. A method as claimed in claim 8, wherein the step of cooling the micro-wiggler assembly comprises surrounding the micro-wiggler assembly with liquid nitrogen.

10. A liquid nitrogen temperature micro-wiggler for a free electron laser comprising:
    a plurality of micro-wiggler elements stacked on top of one another to form a micro-wiggler assembly, each of said micro-wiggler elements comprised of a non-conductive substrate, a thin epitaxial film of high Tc superconductor deposited on top of said non-conductive substrate, and a pair of substantially metallic conductors connected to opposite ends of said thin epitaxial film;
    an energizing means connected to each pair of metallic conductors for energizing each successive micro-wiggler element with an opposite polarity to create an alternating magnetic field along an axis of said micro-wiggler assembly,
    a cooling means comprised of liquid nitrogen surrounding said micro-wiggler assembly for cooling said micro-wiggler elements to a temperature which allows superconductivity; and
    a vacuum tube inserted through an opening along the axis of said micro-wiggler assembly for isolating an electron beam traveling through said alternating magnetic field from said liquid nitrogen, said axial opening created by successive openings in each non-conductive substrate and thin epitaxial film.

11. A micro-wiggler as claimed in claim 10, wherein said energizing means is a power supply connected to each of said pairs of metallic conductors in series.

12. A micro-wiggler as claimed in claim 10, wherein said energizing means is a power supply connected to each of said pairs of metallic conductors in parallel.

13. A micro-wiggler as claimed in claim 10, wherein each of said thin epitaxial films of high Tc superconductor is YbaCuO.

14. A micro-wiggler as claimed in claim 10, wherein each of said pairs of metallic conductors are silver.

15. A micro-wiggler as claimed in claim 10, wherein each of said pairs of metallic conductors are silver-sheathed high Tc filaments.

16. A micro-wiggler as claimed in claim 15, wherein the high Tc filaments are ceramic.

17. A micro-wiggler as claimed in claim 10, wherein each of said non-conductive substrates and each of said thin epitaxial films are rectangular in shape.

18. A micro-wiggler as claimed in claim 10, wherein each of said non-conductive substrates has one or more apertures for aligning each of said micro-wiggler elements.

* * * * *